UNITED STATES PATENT OFFICE.

ROBERT ARNOT, OF ZURICH, SWITZERLAND.

AZO DYE AND ITS PROCESS OF MANUFACTURE.

1,395,238.  Specification of Letters Patent.  Patented Oct. 25, 1921.

No Drawing.   Application filed October 12, 1920.  Serial No. 416,517.

*To all whom it may concern:*

Be it known that I, Dr. ROBERT ARNOT, chemist, a citizen of the Republic of Czecho-Slovakia, residing at Zurich, Switzerland, have invented certain new and useful Improvements in or Relating to Azo Dyes and their Processes of Manufacture, (for which I have filed applications in Germany May 7, 1917, in England July 22, 1920, and in France,) of which the following is a specification.

On the subject of nitroderivatives of retene and its derivatives there is hardly anything to be found in literature, although nitro products are easily obtainable. If retene, retenequinone or retene sulfo-acid is subjected to the action of fuming nitric acid, the nitro products from the first two go quickly into solution in the cold state with a red-brown color and separate out on the addition of water, as yellow flakes, while the nitro-substance of the sulfo-acid remains in solution. The nitro-substances of retene and retenequinone have the peculiarity of being rather difficult to dissolve in alkalis; if it is desired therefore to obtain the amins in alkaline solution, it is advisable to dissolve the nitro substances in alcoholized alkali. The diazonium combinations combine readily and in large quantity with the usual reagents. For the production of nitro-retene it is not necessary to produce the retene in a pure state; it is sufficient to treat with fuming nitric acid the part, so-called tar tallow distilling over in vacuum in the preparation of the resinous oil from pine tar at 250-280°, and which consists mainly of retene (Ekestrand, *Liebigs Ann.* 185, page 75).

In concentrated cold nitric acid retene is insoluble. On being heated it dissolves, foaming and bubbling, with a yellow color. The addition of water causes the nitro substance to precipitate as a yellow deposit. Nitrating is more easily effected with fuming nitric acid, wherefore the latter is preferable as a nitrating medium.

Example 1.

One part retene is added to 3 parts fuming nitric acid stirring the while at a temperature of 15°, and thereafter gradually heated in a water bath for 1 hour to a temperature of 90°. The red-brown solution is left standing for 12 hours and then emptied, while stirring into cold water, whereupon a lemon-yellow flaky precipitate makes its appearance which is drained off, repeatedly washed and dried. It is only with difficulty soluble in soda-solution, ammonia, concentrated solution of sodium hydroxid or ligroin; but on the other hand it is easily soluble in alcoholic alkali, ether, warm methyl and ethyl alcohol, chloroform, glacial acetic acid or benzol. Four parts nitrated retene are dissolved in 25 parts concentrated alcoholic solution of caustic soda; 75 parts water and 12 parts sodium hydrosulfite (80%) are added and the mixture boiled for two hours; after which concentrated hydrochloric acid is added till acid reaction sets in and the sulfurous acid is expelled by vigorous boiling. A brown body now separates out which is filtrated off; in the filtrate is to be found the hydrochloric retencamin which, after cooling with ice is diazotized with 6 parts of a 10% solution of sodium nitrite. The diazonium compound forms with R salt violet, with G salt brown-red, with Andersen's salt red, with H acid violet, with alpha naphthol red. The diazonium combination is, while being stirred, allowed to pass into a solution of 3 parts R-salt and 1 part calcined soda, in 40 parts water, the mixture is again stirred for an hour, the red-violet solution of coloring material is heated to boiling point and finely powdered common salt is added till precipitation sets in. After cooling the dye stuff is thereupon rapidly drained off and dried on clay. In an acid bath it dyes wool and silk in a bluish-red tint and the dyeing bath is not discolored. The wool is placed in the bath at a temperature of 50° and very gradually 2% of sulfuric acid is added, the wool then being left in the bath for one hour at a temperature of 90°.

Example 2.

To ten parts fuming nitric acid cooled with ice four parts retenequinone are gradually added within ¼ of an hour while stirring; the solution turns to an orange-red color, is then heated for one hour to 50° and finally, while being agitated, poured into cold water, whereupon a yellow precipitate is obtained which is drained off and washed repeatedly. The nitrated retenequinone has the same properties as regards solubility as the nitrated retene. In alcoholic alkalis it dissolves, producing an olive-green hue on heating, the solution becomes red and on cooling it becomes green again, and it behaves in the same way as retenequinone toward hot and cold alcoholic solutions of caustic alkalis, a fact to which E. Bamberger already drew attention in the *Annale*, vol. 229, page 119. A red coloration takes place when alkali is added to a warm alcoholic solution of nitrated retenequinone and on cooling the decoloration sets in again. To obtain the amin 4 parts nitroretenequinone are dissolved in 30 parts concentrated alcoholic alkali and boiled for two hours on the reflux-condenser with 30 parts water and 12 parts of 80% solution of sodium hydrosulfite, whereafter it is acidulated with hydrochloric acid and the sulfurous acid is removed by boiling and then filtered. The amin will be found in the filtrate and after being cooled with ice, is diazotized with 5.5 parts of a 10% solution of nitrite. The diazonium solution forms with R-salt a wine-red, with G-salt a brown-red, with Andersen's salt a fuchsia-red, with H-acid violet, with beta naphthol wine-red, with alpha naphthylamin a dark violet. The diazonium solution is poured while stirring into a solution of two parts R-salt and one part calcined soda, in 35 parts water and the dyeing material further worked up exactly as in Example 1. The final dyeing takes place in similar fashion, when a bluish-red tint is obtained.

*Example 3.*

Four parts of retene are added to 20 parts of fuming sulfuric acid (20% $SO_3$), the whole being ice-cooled and then gradually raised to a temperature of 90° for an hour. Into the mixture when well cooled is poured 12 parts concentrated nitric acid, with agitation and the nitro product after being allowed to stand for 12 hours, is poured on ice, whereby the viscous brown substance goes into solution with a yellow color. To this solution is added an excess of iron in the form of powder, then boiled for two hours. The iron is precipitated by alkalis, filtered off and after acidification, 9 parts of a 10% solution of sodium nitrite are poured into the well cooled filtrate. The diazotized retene sulfo-acid couples with R-salt red-brown, with G-salt brown, with Andersen's salt red, with H-acid purple-red. The diazonium-solution is stirred into a solution consisting of 4½ parts R-salt and 1½ parts calcined soda in 50 parts water; the red-brown dyeing material is left standing during 1 hour and then dried by evaporation. The dyeing material left behind is then reduced to a powder. The dyeing is carried out as in Example 2, when a red-brown tint is obtained.

Since certain derivatives, homologues and substitution products of retene will act similarly to retene, it is to be understood that such compounds are included by the term "retene" as used in the claims.

I claim—

1. The diazonium compounds of retene which form with R salt reddish to violet dyes, with G salt brown to brown-red dyes, with Andersen's salt reddish dyes, and with H acid violet to purple red dyes.

2. A dye compound having a diazonium compound of retene radical in its molecule.

3. Azo-dyestuffs comprising diazo-combinations of retene coupled with azo dyestuff components.

4. A process for making azo-dyestuffs comprising coupling diazo-combinations of retene with azo-dyestuff components.

5. A process of making an intermediate compound for making dyes, which comprises nitrating retene, reducing the resulting nitro compound to amin and diazotizing said amin.

In testimony whereof I have hereunto set my hand in presence of two subscribing witnesses.

Dr. ROBERT ARNOT.

Witnesses:
  O. M. DURIG.
  AUGUST RÜEGG.